United States Patent
Anumula et al.

(10) Patent No.: US 10,210,133 B2
(45) Date of Patent: *Feb. 19, 2019

(54) VIRTUALIZING COHERENT HARDWARE ACCELERATORS

(71) Applicant: International Business Machines Corporation, Armonk, NY (US)

(72) Inventors: Venkata N. S. Anumula, Hyderabad (IN); Madhusudanan Kandasamy, Gobichettipalayam (IN); Sudhir Maddali, Hyderabad (IN); Sanket Rathi, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/889,269

(22) Filed: Feb. 6, 2018

(65) Prior Publication Data

US 2018/0137080 A1 May 17, 2018

Related U.S. Application Data

(63) Continuation of application No. 15/262,058, filed on Sep. 12, 2016.

(51) Int. Cl.
*G06F 12/00* (2006.01)
*G06F 13/00* (2006.01)
(Continued)

(52) U.S. Cl.
CPC ............ *G06F 15/167* (2013.01); *G06F 3/067* (2013.01); *G06F 3/0613* (2013.01);
(Continued)

(58) Field of Classification Search
None
See application file for complete search history.

(56) References Cited

U.S. PATENT DOCUMENTS

| | | |
|---|---|---|
| 6,944,847 B2 | 9/2005 | Desai et al. |
| 8,201,190 B2 | 6/2012 | Billau et al. |

(Continued)

OTHER PUBLICATIONS

List of IBM Patents or Patent Applications Treated as Related, Appendix P, Filed Herewith.

(Continued)

*Primary Examiner* — Sean D Rossiter
(74) *Attorney, Agent, or Firm* — Daniel R. Simek

(57) ABSTRACT

An approach to virtualizing a coherent memory hardware accelerator is provided comprising creating a segment table for a client logical partition (LPAR), wherein a virtual address space is reserved in the segment table, receiving an Input/Output (I/O) request to use the coherent memory hardware accelerator, generating an I/O operation associated with the I/O request, wherein the I/O operation is passed to the coherent memory hardware accelerator, receiving a map request from the coherent memory hardware accelerator, creating an entry in the reserved virtual address space in the segment table, creating a hardware page table map request for mapping a memory address associated with the client LPAR and returning the reserved virtual address space to the coherent memory hardware accelerator, wherein the coherent memory hardware accelerator has remote direct memory access to memory associated with the client LPAR for performing an acceleration of one or more processes.

1 Claim, 4 Drawing Sheets

(51) Int. Cl.
  *G06F 15/167* (2006.01)
  *G06F 3/06* (2006.01)
  *G06F 15/78* (2006.01)
  *G06F 12/1009* (2016.01)

(52) U.S. Cl.
  CPC ........ *G06F 3/0659* (2013.01); *G06F 15/7889* (2013.01); *G06F 12/1009* (2013.01); *G06F 2212/154* (2013.01)

(56) References Cited

U.S. PATENT DOCUMENTS

| | | | |
|---|---|---|---|
| 9,448,901 B1 | 9/2016 | Aslam et al. | |
| 10,055,142 B1* | 8/2018 | Bates | G06F 3/0613 |
| 2003/0204648 A1 | 10/2003 | Arndt | |
| 2012/0066543 A1* | 3/2012 | Pafumi | G06F 11/2005 714/4.11 |
| 2012/0151473 A1 | 6/2012 | Koch et al. | |
| 2015/0205729 A1* | 7/2015 | Bates | G06F 12/1081 710/26 |
| 2015/0205738 A1* | 7/2015 | Bates | G06F 12/1081 710/308 |
| 2015/0317274 A1 | 11/2015 | Arroyo et al. | |
| 2016/0210167 A1 | 7/2016 | Bolic et al. | |
| 2016/0321113 A1* | 11/2016 | Pinto | G06F 9/45533 |
| 2017/0124451 A1* | 5/2017 | Barham | G06F 9/5038 |
| 2017/0293428 A1* | 10/2017 | Radovanovic | G06F 12/0804 |
| 2018/0074909 A1* | 3/2018 | Bishop | G06F 11/1451 |
| 2018/0107385 A1* | 4/2018 | Johns | G06F 3/061 |

OTHER PUBLICATIONS

Anumula, et al., "Virtualizing Coherent Hardware Accelerators", U.S. Appl. No. 15/262,058, filed Sep. 12, 2016.

* cited by examiner

VIRTUALIZING COHERENT HARDWARE ACCELERATORS

BACKGROUND

The present invention relates generally to the fields of virtualization, Input/Output (I/O) resource virtualization, and more particularly to hardware accelerators.

In computing, virtualization refers to the logical division of hardware resources (e.g., processors or memory) in a computer system, creating logical partitions (LPARs) which may be used for a variety of purposes. LPARs, sometimes known as Virtual Machines (VMs), can act like separate, real computers running on a single computer system and can be used to emulate different operating systems. A hypervisor is a software and/or hardware component which is used to create and run VMs.

A host partition can run software that enables the sharing of physical I/O resources amongst the host partition and client LPARs. One such example of I/O virtualization software is Virtual I/O Server (VIOS) by International Business Machines Corporation. Using VIOS, physical I/O resources such as, but not limited to, Small Computer Serial Interface (SCSI) devices, Fibre Channel adapters and Ethernet adapters can be shared amongst client LPARs.

Hardware accelerators are hardware components that can be installed on a computer system and execute certain processes, such as computing numerically intensive algorithms, more efficiently than other general purpose processors in the system. Hardware accelerators can be coprocessors and may include field-programmable gate arrays (FPGAs). FPGAs are configurable integrated circuits that can be customized and used for a variety of applications, such as the specific processing of different algorithms.

SUMMARY

According to one embodiment of the present invention, a method for virtualizing a coherent memory hardware accelerator is provided, the method comprising creating, by an accelerator virtualizer, a segment table for a client logical partition (LPAR), wherein a virtual address space is reserved in the segment table; receiving, by the accelerator virtualizer, an Input/Output (I/O) request to use the coherent memory hardware accelerator; generating, by the accelerator virtualizer, an I/O operation associated with the I/O request, wherein the I/O operation is passed to the coherent memory hardware accelerator; receiving, by the accelerator virtualizer, a map request from the coherent memory hardware accelerator; creating, by the accelerator virtualizer, an entry in the reserved virtual address space in the segment table; creating, by the accelerator virtualizer, a hardware page table map request for mapping a memory address associated with the client LPAR; and returning, by the accelerator virtualizer, the reserved virtual address space to the coherent memory hardware accelerator, wherein the coherent memory hardware accelerator has remote direct memory access to memory associated with the client LPAR for performing an acceleration of one or more processes. A corresponding computer program product and computer system are also disclosed herein.

DETAILED DESCRIPTION

Coherent Accelerator Processor Interface (CAPI), by International Business Machines Corporation (IBM), is an acceleration engine for performing accelerated executions of client-specific processes, such as computationally intensive algorithms. CAPI adapters, having built-in memory address translation and exception generation logic, can directly access memory of client software, enabling CAPI to participate in the coherent memory structure of a computer system on which it runs. Embodiments of the present invention recognize, however, that some hardware accelerators such as, but not limited to, CAPI, do not support remote direct memory access (RDMA) for accessing client LPAR memory and therefore cannot be virtualized in a VM environment.

For example, with RDMA on IBM Power Systems, data packets can be transmitted and received directly between an I/O adapter and client memory without the need for the data to be copied to VIOS memory, reducing the memory consumption of VIOS and the host processor on which it runs. This reduction in memory consumption results in efficient memory access and virtual I/O performance that is equivalent to physically connected I/O performance.

To achieve RDMA, a Translation Control Entry (TCE) table is a form of an Input-Output Memory Management Unit (IOMMU) used for providing direct memory access (DMA) to the I/O bus of an I/O adapter. The TCE table enables the mapping of virtual addresses generated by I/O devices to physical addresses in memory. CAPI adapters do not support TCE however, and therefore cannot be virtualized in a VM environment for programs running on client LPARs. Embodiments disclosed herein therefore provide a solution for enabling CAPI or other similar hardware accelerators to be virtualized via client memory address mapping.

In describing embodiments in detail with reference to the figures, it should be noted that references in the specification to "an embodiment," "other embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, describing a particular feature, structure or characteristic in connection with an embodiment, one skilled in the art has the knowledge to affect such feature, structure or characteristic in connection with other embodiments whether or not explicitly described.

Figure 1:
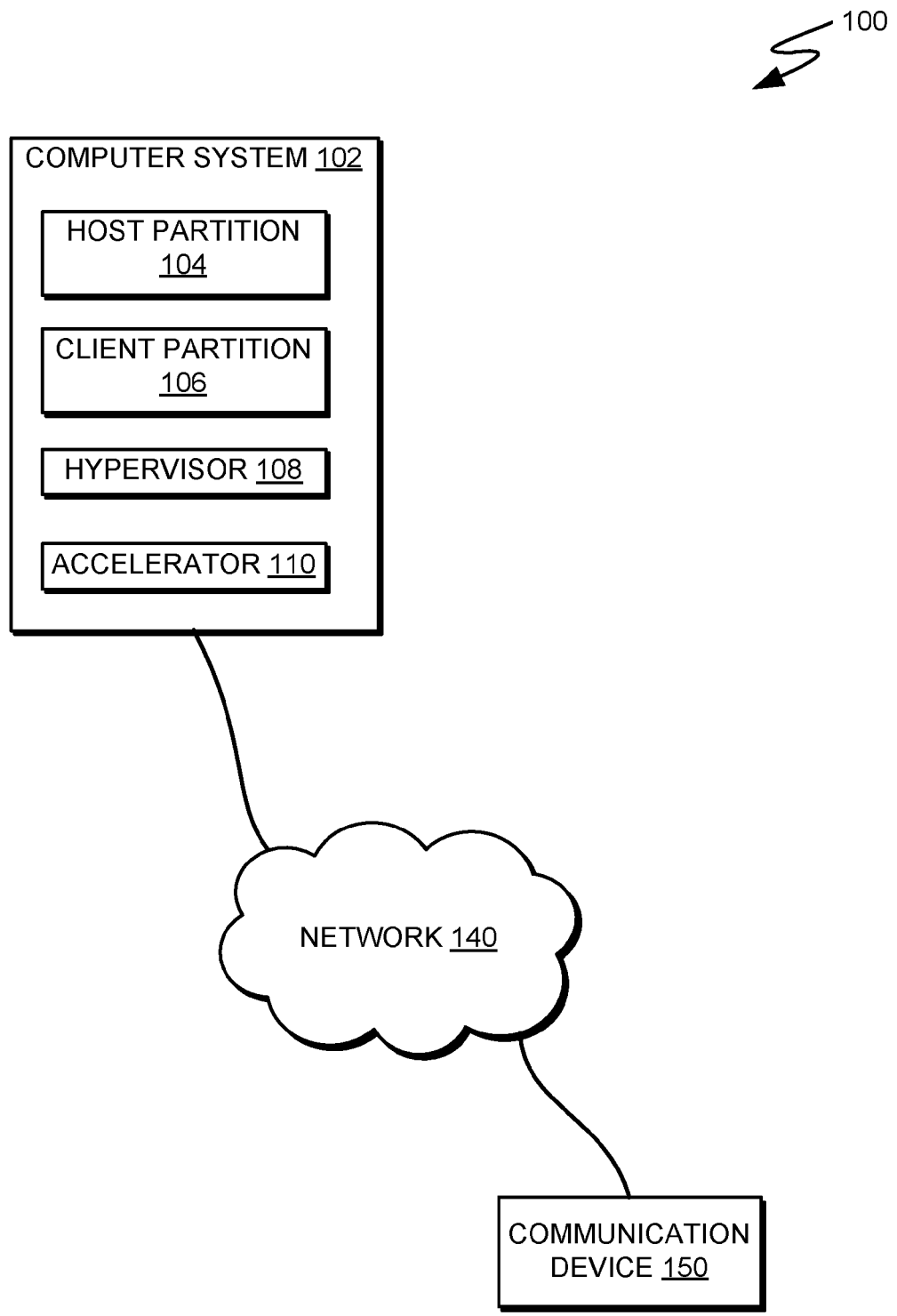
FIG. 1 is a functional block diagram illustrating a distributed data processing environment, in accordance with an embodiment of the present invention.

The present invention will now be described in detail with reference to the figures. FIG. 1 is a functional block diagram illustrating a distributed data processing environment 100, in accordance with one embodiment of the present invention. Distributed data processing environment 100 comprises computer system 102 and communication device 150, all interconnected over network 140.

Computer system 102 can be a laptop computer, tablet computer, netbook computer, personal computer (PC), a desktop computer, a personal digital assistant (PDA), a smart phone, or any programmable electronic device capable of communicating with communication device via network 140. Computer system 102 comprises host partition 104, client partition 106, hypervisor 108 and accelerator 110. Computer system 102 may include internal and external hardware components, as depicted and described in further detail with respect to FIG. 4.

Host partition 104 is an LPAR of a processor comprising computer system 102 running I/O resource virtualization software. Hypervisor 108 is a component used to create and run LPARs, e.g., host partition 104 and client partition 106. In some embodiments, host partition 104 comprises hypervisor 108. Accelerator 110 is a hardware accelerator such as, but not limited to, CAPI. CAPI is implemented as an adapter connected to host partition 104, i.e. a co-processor. In general, accelerator 110 can be a co-processor communicatively coupled to host partition 104.

It should be noted that host partition 104 and client partition 106 can be different LPARs of the same physical computing resource such as, but not limited to, a computer processor. In other embodiments, host partition 104 and client partition 106 are LPARs residing on separate processors associated with computer system 102.

In various embodiments of the present invention, communication device 150 can be a laptop computer, tablet computer, netbook computer, personal computer (PC), a desktop computer, a personal digital assistant (PDA), a smart phone, or any programmable electronic device capable of communicating with computer system 102 via network 140.

Network 140 can be, for example, a local area network (LAN), a wide area network (WAN) such as the Internet, or a combination of the two, and can include wired, wireless, or fiber optic connections. In general, network 140 can be any combination of connections and protocols that will support communications between computer system 102 and communication device 150.

Figure 2A:
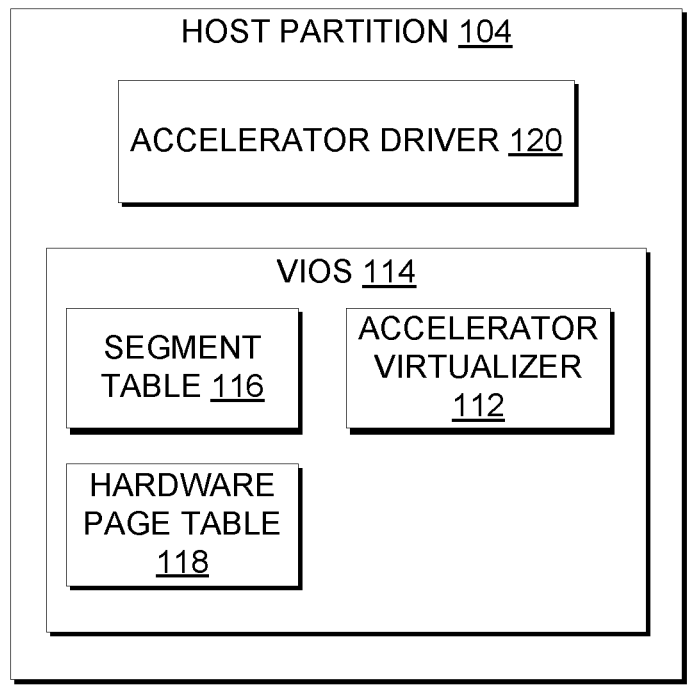
FIGS. 2A-B are a functional block diagram illustrating components of a host partition and a functional block diagram illustrating components of a client partition, respectively, in accordance with an embodiment of the present invention.

FIG. 2A is a functional block diagram illustrating components of host partition 104, in accordance with an embodiment of the present invention. Host partition 104 comprises accelerator driver 120 and VIOS 114, which further comprises segment table 116, hardware page table (HPT) 118 and accelerator virtualizer 112. It should be noted that in other embodiments, VIOS 114 can be other software programs capable of virtualizing physical I/O resources for sharing amongst LPARs. Accelerator driver 120 is software acting as an interface between accelerator 110 and programs using accelerator 110. Accelerator driver 120 can be for example, but is not limited to, CAPI driver software. Accelerator virtualizer 112 is a component for enabling the virtualization of accelerator 110 for I/O requests received from client (remote) LPARs. In some embodiments, accelerator virtualizer 112 is a stand-alone program which can run independently from VIOS 114.

Figure 2B:
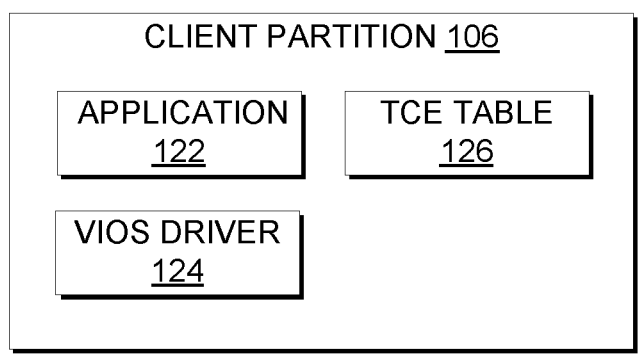

FIG. 2B is a functional block diagram illustrating components of client partition 106, in accordance with an embodiment of the present invention. Client partition 106 comprises application 122, VIOS driver 124 and TCE table 126. Application 122 is a software program requesting to use accelerator 110 for an accelerated execution of one or more processes, e.g., one or more algorithms. VIOS driver 124 is a software program acting as an interface between VIOS 114 and client partition 106. TCE table 126 is a table for mapping virtual addresses to physical address locations in memory associated with client partition 106.

Figure 3:
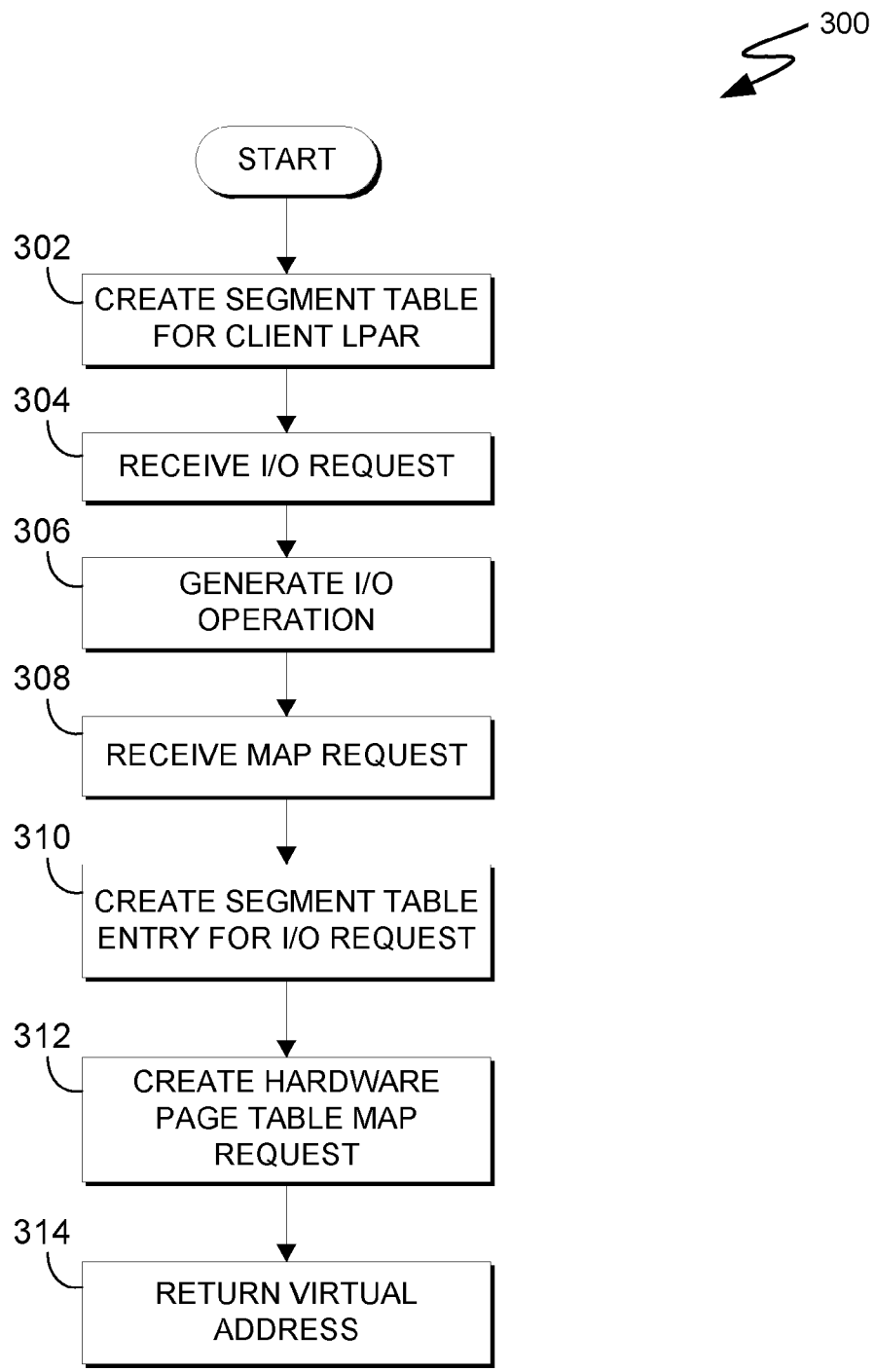
FIG. 3 is a flowchart depicting operational steps of an accelerator virtualizer, in accordance with an embodiment of the present invention.

FIG. 3 is a flowchart 300 depicting operational steps of accelerator virtualizer 112 for virtualizing a hardware accelerator, in accordance with an embodiment of the present invention. The illustrative example of FIG. 3 is provided to facilitate discussion of aspects of the present invention, and it should be appreciated that FIG. 3 provides only an illustration of an embodiment of the present invention and does not imply any limitations with regard to the variations or configurations in which different embodiments may be implemented.

Accelerator virtualizer 112 creates segment table 116 for client partition 106, communicatively connected to VIOS 114 (step 302). A virtual address space is reserved in segment table 116 for an address mapping of I/O buffer pages associated with an I/O request from client partition 106. Accelerator virtualizer 112 receives an I/O request from hypervisor 108, originating from application 122 on client partition 106 (step 304). The I/O request comprises, for example, an opaque handle to a virtual address range associated with a translation control entry (comprising TCE table 126) and an indicator of the size (in client memory) of the I/O buffer pages associated with the I/O request.

On client partition 106, an I/O request from application 122 to use accelerator 110 is sent to VIOS driver 124. VIOS driver 124 can request a kernel context associated with client partition 106 to map the physical memory address (i.e., memory associated with client partition 106) of the I/O buffer pages to a virtual address range in TCE table 126. The kernel context can forward the request to hypervisor 108 which can validate the physical memory address of the I/O buffer pages in client memory and create a translation control entry in TCE table 126. The translation control entry is populated with the physical memory address of the I/O buffer pages, which are associated with the virtual address range in TCE table 126. VIOS driver 124 creates the I/O request and passes it to hypervisor 108 to be sent to VIOS 114.

Accelerator virtualizer 112 generates an I/O operation associated with the received I/O request and passes the I/O operation to accelerator driver 120 (step 306). The I/O operation comprises the opaque handle to the virtual address range associated with the translation control entry and a flag indicating that the I/O operation is associated with a client (remote) LPAR. Accelerator virtualizer 112 receives a request from accelerator driver 120 (originating from accelerator 110) to map the I/O buffer pages into segment table 116 (step 308).

Accelerator virtualizer 112 creates an entry in segment table 116 associated with the reserved virtual address space (step 310). The entry in segment table 116 comprises the virtual address range associated with the translation control entry and the size of the I/O buffer pages. Accelerator virtualizer 112 creates a request to map the physical memory address of the I/O buffer pages (in client memory) into HPT 118, i.e., a hardware page table map request, and passes the request to hypervisor 108 (step 312). The request to map the I/O buffer pages client memory address into HPT 118 comprises the virtual address range associated with the translation control entry, the opaque handle to the translation control entry and the indicator of the size of the I/O buffer pages.

Responsive to receiving the hardware page table map request, hypervisor 108 can access the translation control entry associated with TCE table 126 to obtain the physical memory address of the I/O buffer pages in client (i.e., client partition 106) memory. Hypervisor 108 can map the virtual address range (associated with the translation control entry) to the physical memory address of the I/O buffer pages (obtained from TCE table 126) in HPT 118. That is, hypervisor 108 populates HPT 118 with the physical memory address of the I/O buffer pages.

Accelerator virtualizer 112 returns the reserved virtual address space in segment table 116, i.e., an effective address, to accelerator driver 120 (step 314). Using the effective address, accelerator 110 (having its own address translation mechanism) can access segment table 116 and HPT 118 and use the client I/O buffer pages mapping to read and write directly to client memory for performing an acceleration of a process associated with the I/O request, e.g., a process associated with application 122. Thus, virtualization is achieved for accelerator 110 via RDMA.

Figure 4:
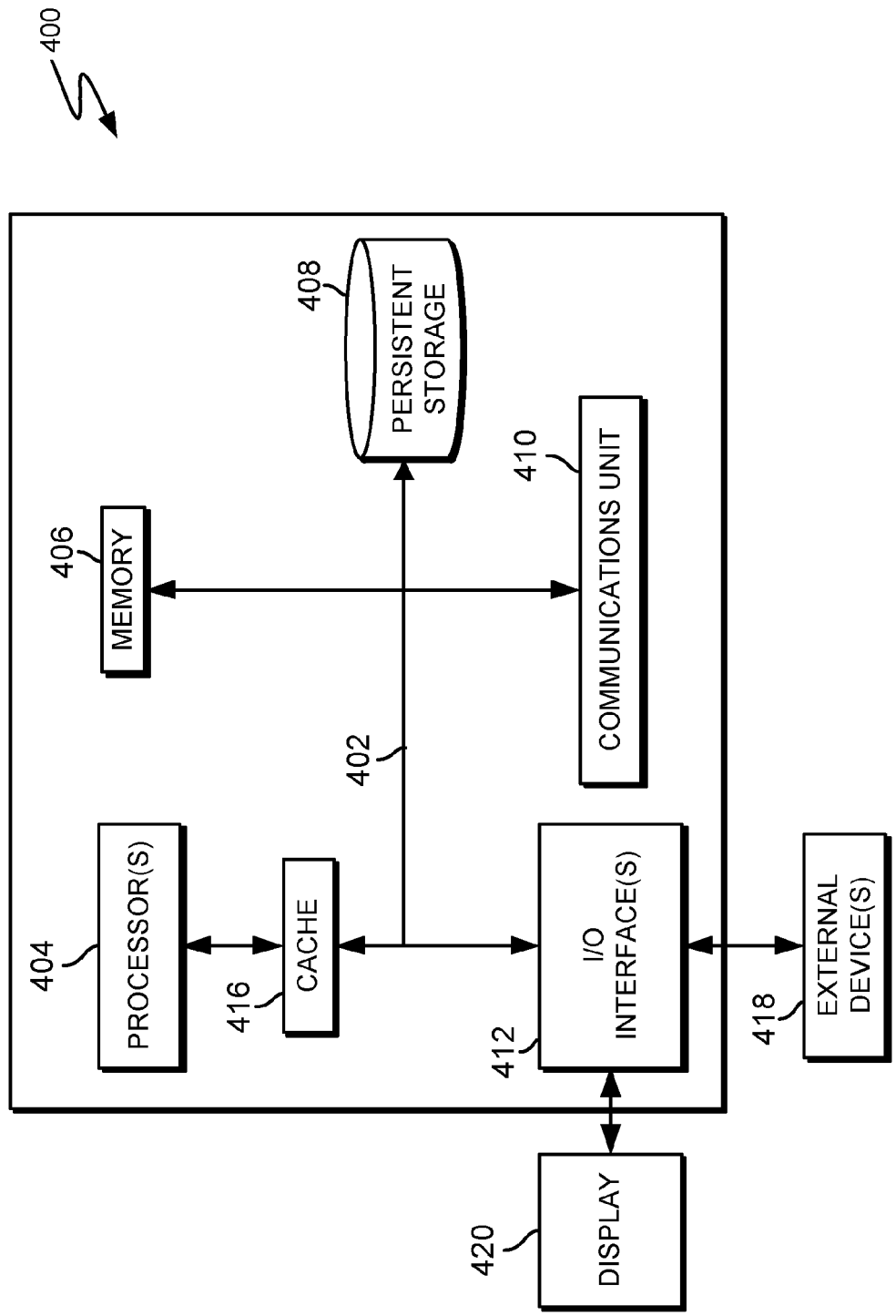
FIG. 4 is a block diagram of components of the computer system executing the accelerator virtualizer, in accordance with an embodiment of the present invention.

FIG. 4 depicts a block diagram 400 of components of computer system 102 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computer system 102 includes communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Accelerator virtualizer 112 can be stored in persistent storage 408 and in memory 406 for execution by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 can also be removable. For example, a removable hard drive can be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 can provide communications through the use of either or both physical and wireless communications links. Accelerator virtualizer 112 can be downloaded to persistent storage 408 through communications unit 410.

I/O interface(s) 412 allows for input and output of data with other devices that can be connected to computer system 102. For example, I/O interface 412 can provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., accelerator virtualizer 112, can be stored on such portable computer readable storage media and can be loaded onto persistent storage 408 via I/O interface(s) 412. I/O interface(s) 412 also connect to a display 420. Display 420 provides a mechanism to display data to a user and can be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for virtualizing a hardware accelerator that utilizes a coherent accelerator processor interface (CAPI), the method comprising:
   creating, by one or more processors of a virtual Input/Output server (VIOS), a segment table for a client logical partition (LPAR), wherein a virtual address space is reserved in the segment table, and wherein the virtual address space is utilized for mapping of Input/Output buffer pages of the client LPAR;
   receiving, by one or more processors of the VIOS, an Input/Output (I/O) request to use a hardware accelerator,
      wherein the I/O request to utilize the hardware accelerator originates from the client LPAR and is associated with the I/O buffer pages in client LPAR memory,
      wherein the I/O request comprises a handle to a virtual address range associated with a translation control entry and a size of the I/O buffer pages, and
      wherein the translation control entry is populated with a physical memory address corresponding to the I/O buffer pages;
   generating, by one or more processors of the VIOS, an I/O operation associated with the I/O request, wherein the I/O operation is passed to the hardware accelerator, and wherein the I/O operation comprises the handle and a flag associating the I/O operation with the client LPAR;
   receiving, by one or more processors of the VIOS, a request to map the I/O buffer pages into the segment table of the client LPAR;
   creating, by one or more processors of the VIOS, an entry in the reserved virtual address space in the segment table, wherein the entry in the reserved virtual address space is populated with the virtual address range associated with the translation control entry and the size of the I/O buffer pages;

creating, by one or more processors of the VIOS, a hardware page table map request for mapping a memory address associated with the client LPAR, wherein the hardware page table map request is passed to a hypervisor and in response, the hypervisor further maps the virtual address range to the physical memory address of the I/O buffer pages in a hardware page table; and identifying, by one or more processors of the VIOS, the reserved virtual address space to the hardware accelerator, wherein the hardware accelerator utilizes the identified reserved virtual address space, and information within the segment table and the hardware page table to utilize remote direct memory access between memory associated with the client LPAR and the hardware accelerator to perform an acceleration of one or more processes.

\* \* \* \* \*